July 27, 1965 R. J. BOYLE ETAL 3,197,280
PRODUCTION OF PHOSPHORIC ACID
Filed Jan. 11, 1962
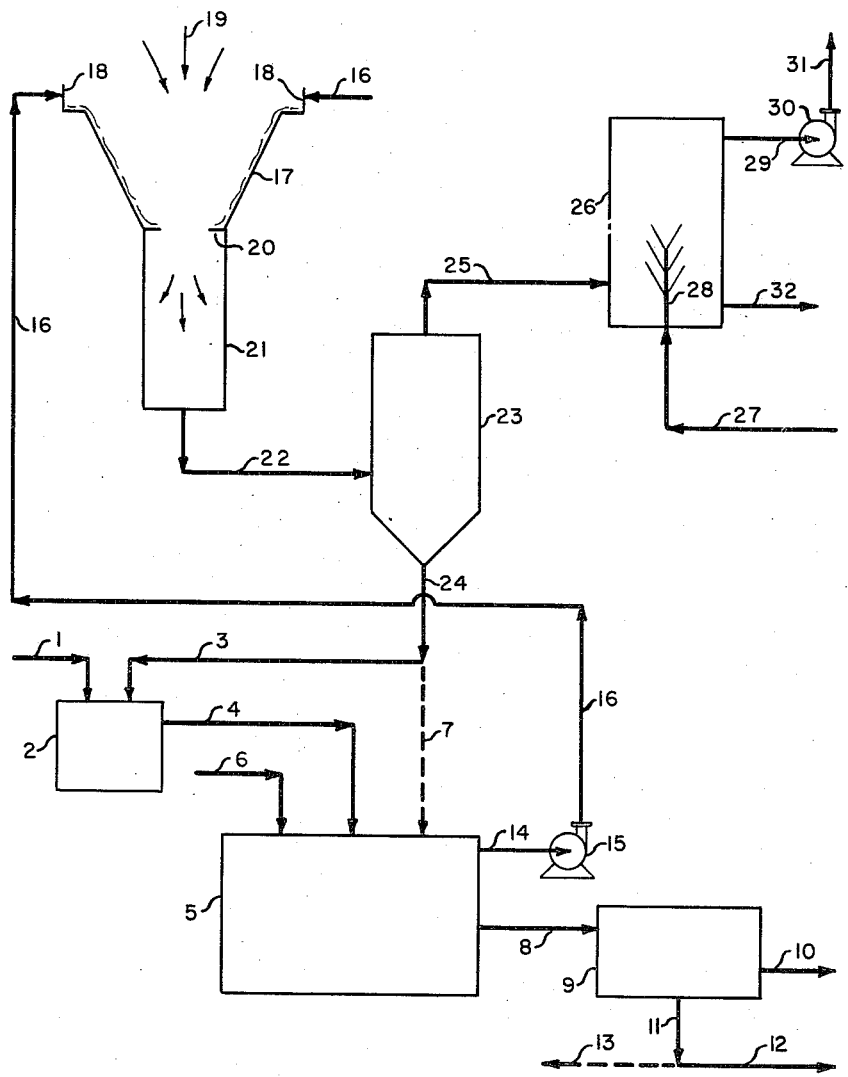
ROBERT J. BOYLE
JAMES A. GROSS
*INVENTORS*
BY *J. J. Chalupy*
*AGENT*

United States Patent Office 3,197,280
Patented July 27, 1965

3,197,280
PRODUCTION OF PHOSPHORIC ACID
Robert J. Boyle, Scotch Plains, and James A. Gross, East Brunswick, N.J., assignors to Chemical Construction Corporation, New York, N.Y., a corporation of Delaware
Filed Jan. 11, 1962, Ser. No. 165,514
5 Claims. (Cl. 23—165)

This invention reates to the production of phosphoric acid by the treatment of phosphate rock with sulfuric acid. An improved method and apparatus have been developed for cooling the process slurry and removing heat generated during the reaction.

The production of phosphoric acid by the digestion of phosphate rock with sulfuric acid is a well-known industrial process. In this procedure, ground phosphate rock is usually mixed with a slurrying solution prior to addition of sulfuric acid, in order to dilute and regulate the subsequent exothermic reaction with sulfuric acid. Following this, the sulfuric acid is added in a separate digestion step. The reaction yields a phosphoric acid solution together with solid calcium sulfate crystals. After reaction is completed, the final product slurry is filtered. The filtrate solution, known as "wet-process," phosphoric acid, may either be further purified or directly utilized in other processing such as the manufacture of triple superphosphate fertilizer.

Crystallization of calcium sulfate in a proper crystal form and size is an important process consideration, since successful commercial operation of the process depends on such factors as ease of filtration of the product acid from the final reaction slurry, avoidance of acid occlusion or entrainment in the calcium sulfate, etc. Thus, the crystallization of calcium sulfate must be closely controlled in practice. Reaction temperature is an important process variable in controlling crystal growth and size, and consequently, the reaction heat which is generated due to digestion of the phosphate rock with acid must be removed from the process slurry in a continuous manner.

Cooling the process slurry is complicated by the fact that solid calcium sulfate is continuously precipitated from solution as the reaction proceeds. Thus, conventional cooling means such as a cooling coil in the reaction vessel will not provide the desired cooling effect in a continuous process, because buildup of a deposited calcium sulfate coacting on the coil has an insulating effect and seriously interferes with heat transfer. Under some circumstances, such as described in U.S. Patent No. 2,890,936, a cooling coil is employed in this process, however the coating must be periodically removed. In this patent, the coating ir removed by passing steam through the cooling coil. The resultant expansion causes the coating of calcium sulfate to crack or flake off from the outer surface of the coil.

Another well-known cooling procedure is shown in U.S. Patent 2,064,833. In this process, a stream of cooling air is dispersed into contact with a pool of reaction slurry, by forcing the air into a distribution chamber having an outlet below the surface of the pool. Finally, cooling may also be accomplished by vacuum evaporation of water from the slurry, as shown in U.S. 2,699,985.

These prior art procedures are subject to various drawbacks, such as high power requirements, difficulties in process control due to foaming and surging, substantial entrainment of slurry components in other process streams, and coating of apparatus elements or sections with calcium sulfate.

In the present invention, these objectionable aspects of prior art processes are avoided by a unique procedure which cools the reaction slurry in a continuous manner by contact with air. The hot slurry is directed into transverse contact with an accelerated stream of cooling air. Thus, the slurry is dispersed into the air stream in the form of small droplets and particles. Equilibrium between the slurry and the air stream is almost instantly attained, with in situ deposition of calcium sulfate in the process stream. The heated and moisture-laden air stream is consequently separated from the cooled slurry with significant deposition of calcium sulfate, and the slurry is thereafter returned to the process. The contact between the hot slurry and the cooling air is accomplished by means of a novel apparatus, consisting of a chamber having upper inlets for air and slurry, downwardly converging walls, means to disperse slurry on the walls, and a lower outlet. Means are provided at the lower end of the chamber, preferably at the outlet, to project the downflowing slurry transversely into the accelerated air stream. Thus, the air stream itself acts to disperse the slurry, resulting in maximum contact and almost immediate or flash cooling to equilibrium. Thereafter the cooled slurry is readily separated from the air stream by conventional means, and is recycled to the process.

It is an object of the present invention to produce phosphoric acid by reaction of phosphate rock with sulfuric acid in a reaction slurry.

Another object is to cool the reaction slurry produced in this process in an improved manner.

A further object is to cool the reaction slurry produced in this process by contact with air.

An additional object is to prevent the deposition of calcium sulfate on process apparatus while cooling this reaction slurry.

Still another object is to effectively control operating temperatures and remove excess heat which is generated due to reaction of sulfuric acid with phosphate rock.

Still a further object is to provide a method and apparatus for effectively and uniformly dispersing this reaction slurry into a stream of cooling air.

These and other objects and advantages of the process of the present invention will become evident from the description which follows. Referring to the figure, stream 1 consisting of phosphate rock is passed into mixer 2, together with cooled recycle slurry stream 3. Stream 1 will usually consist of rock which has been ground to a powder, typically 60% minus 200 mesh, with a phosphorus content expressed as pentoxide in the range of 25% to 35% by weight. The mass flow rate of stream 3 is generally much greater than stream 1. In any case, the streams are mixed in unit 2, to form a uniform slurry containing unreacted rock.

A process stream 4 consisting of the mixed slurry is now withdrawn from mixer 2 and passed to digester 5. Sulfuric acid stream 6 is also fed to digester 5, in a proportion required to react with the rock feed stream 1. Stream 6 generally consists of diluted acid with a free acid strength of 40% to 70% by weight, although stronger acid is sometimes employed. The reaction between rock and acid is moderated and becomes more uniform when the acid strength is lowered. A recycle stream 7 consisting of cooled slurry may also be passed to digester 5, in cases where the process cooling step requires more slurry circulation than is needed to slurry the incoming rock in mixer 2. A reaction temperature in the general range of 140° F. to 195° F. is maintained in digester 5, while the exothermic reaction between phosphate rock and sulfuric acid takes place. The slurry system in unit 5 is usually maintained with a solids concentration of 25% to 45% by weight, and is saturated with calcium sulfate. Thus, continuous crystallization of solid calcium sulfate takes place in digester 5 as the reaction proceeds. In most cases digester 5 in practice will consist of several interconnected tanks, with series flow of the process slurry from one tank to the next so as to prevent backmixing.

A final reacted slurry, consisting of solid calcium sulfate together with product phosphoric acid solution, is withdrawn from digester 5 via stream 8, and is passed to filter 9. In unit 9, which may be any means for solids-liquid separation, stream 8 is separated into solid calcium sulfate stream 10 and crude phosphoric acid solution 11. Stream 11 will generally have a phosphorus pentoxide strength in the range of 25% to 35% by weight. Stream 11 is now passed to product utilization via stream 12, while optional recycle stream 13 may be returned to the process to serve as a diluent for sulfuric acid stream 6.

In the present invention, the overall process system is maintained at a desired temperature level by removing a stream of reaction slurry from the main digestion system and cooling this stream in a novel manner. The resulting cooled slurry is then recycled to the main process, preferably as the recycle slurry stream 3, which is mixed with incoming rock stream 1 in mixing tank 2. As mentioned supra, the reaction between phosphate rock and sulfuric acid is exothermic, and thus heat must be removed from the digestion system to prevent a temperature rise with its concomitant disadvantages. Thus, a side stream of reaction slurry is removed from digester 5 via stream 14 for cooling in accordance with the present invention. Stream 14 will generally be similar in composition to stream 8, however, if digester 5 consists of a plurality of tanks it will generally be desirable to obtain stream 14 from a tank preceding the final tank from which stream 8 is withdrawn. In any case, stream 14 will usually be of much greater flow rate than stream 8, in order to maintain a large volume of recirculating slurry in the system, which results in uniform reaction conditions.

Stream 14 now passes via pump 15 as stream 16 to the cooling step of the process, which takes place in unit 17. Unit 17 is a vessel in which contact between slurry stream 16 and air is obtained in a novel manner. Thus, unit 17 is provided with upper distributing means such as weir 18, for dispersing stream 16 onto the inner surface of the vessel. Stream 16 thus flows downwards over the downwardly converging walls of unit 17. Air stream 19 also passes into vessel 17. Stream 19 is highly accelerated in unit 17, due to convergence of the flow passage. Unit 17 is preferably circular or funnel-shaped, however, it will be understood that rectangular configurations may also be provided. In any case, the downward convergence of the flow passage results in an acceleration of the air stream velocity. A concomitant increase in the velocity of the downflowing slurry stream also takes place.

At the lower end of the converging walls of unit 17, a further flow constriction is preferably provided by means of projection lips 20. The downflowing slurry is now projected substantially horizontally and transverse to the high velocity air flow by means of lips 20. Other projection means besides lips 20 may be provided, thus an auxiliary horizontal slurry inlet could be provided at the point where lips 20 are shown, in order to direct slurry flow horizontally and transverse to the high velocity air flow. In any case, a sudden and thorough dispersal of slurry into the air stream takes place, and a mixed air-slurry stream is formed in the lower chamber 21. This mixed air-slurry stream consists of liquid droplets and solid particles dispersed in the air stream. Complete equilibrium is almost instantly obtained in unit 21 between the incoming air and the slurry. Thus, ambient air stream 19 at a temperature of 30° F. to 105° F. is heated up to the range of 130° F. to 185° F. and is also saturated with water vapor in chamber 21. Slurry stream 16 is cooled by 5° F. to 30° F., preferably from an initial temperature in the range of 140° F. to 195° F., to a lower final temperature in the range of 120° F. to 190° F. Deposition of solid calcium sulfate on the process equipment is essentially avoided, because cooling and final equilibrium are rapidly attained within the mixed air-slurry stream in unit 21 rather than by slower prior art procedures.

The mixed air-slurry stream is now passed via stream 22 to separator means 23, which will preferably consist of a cyclonic vessel or other suitable unit. The cooled slurry stream is withdrawn via stream 24 and recycled to the main process system via stream 3, and optionally also via stream 7.

The heated air stream is withdrawn from unit 23 via stream 25. Stream 25 will usually contain fluorine vapors and other objectionable components, and is therefore passed to a scrubber such as cyclonic gas scrubber 26 before discharge to the atmosphere. The air stream 25 is passed tangentially into unit 26 and spirals upwards, while scrubbing water or other suitable liquid stream 27 is dispersed radially into the unit via axial spray element 28. The scrubbed air stream is withdrawn via tangential outlet 29 and now passes via blower 30 to disposal via stream 31. Scrub water containing a minor proportion of fluosilicic acid is removed from the bottom of unit 26 via stream 32, and may be discarded or recirculated to produce a concentrated fluosilicic acid by-product.

Various alternatives within the scope of the present invention may be mentioned. Thus, slurry stream 16 is dispersed into vessel 17 by means of weir 18. Alternatively, a plurality of feed nozzles could be employed for this purpose. In this case, the nozzles would be preferably disposed with a component of flow direction tangentially to the inner wall of unit 17. This would serve to give a spiral flow pattern to the slurry as it is passing downwards inside unit 17, and thus would lead to more uniform projection of the slurry from lips 20. Another alternative arrangement of equipment in the present invention would consist of enclosing the upper end of unit 17 except for an air inlet, and providing an alternative or additional blower element to pass air into unit 17 under positive pressure. In this case, the inlet air temperature would be raised to a level above ambient since the air stream would be heated up in passing through the blower.

An example of application of the process of the present invention in an operating facility will now be described.

*Example*

A wet process phosphoric acid facility having an acid output of 10 tons/day of contained phosphorus pentoxide was operated in accordance with the present invention. About 150 gallons/minute of reaction slurry was cooled with 1000 cubic feet/minute of air, from an initial temperature of 170° F. to a final temperature of 161° F. A polyesterlined contact unit was provided, for operation without noticeable corrosion or erosion, and without significant deposition of solid calcium sulfate.

The product slurry was produced at a rate of 6 gallons/minute, and was filtered at 170° F. The total phosphorus pentoxide in the crude product phosphoric acid solution amounted to 97% recovery.

The test facility indicated that installed cost of such units is about 60% of comparable vacuum cooling equipment. The unit is also of comparatively simple construction, and achieves highly efficient gas-liquid contact. Operating costs are also fully competitive with existing systems.

We claim:

1. In a phosphoric acid process in which phosphate rock is mixed with cooled recycle slurry, the resulting mixed slurry is reacted with sulfuric acid to form phosphoric acid and calcium sulfate in a high temperature reaction slurry, and the final reacted slurry is filtered to separate solid calcium sulfate from product phosphoric acid solution, the improved method of cooling said reaction slurry with air and precipitating calcium sulfate which comprises directing a portion of said slurry onto the inner surface of a downwardly converging passage, passing an inlet air stream downwards through said passage whereby said air stream is accelerated, projecting said slurry transversely into said air stream at the lower end of said passage, whereby said slurry is rapidly and uniformly dispersed into said air stream as finely divided particles and droplets, separating the resulting heated air stream from the cooled slurry, and returning the cooled slurry as said cooled recycle slurry.

2. In a phosphoric acid process in which phosphate rock having an equivalent phosphorus pentoxide content in the range of 25% to 35% by weight is mixed with cooled recycle slurry at a temperature of 120° F. to 190° F., the resulting mixed slurry is reacted with sulfuric acid solution of 40% to 70% by weight acid strength to form phosphoric acid and calcium sulfate in a reaction slurry at a temperature in the range of 140° F. to 195° F., and the final reacted slurry containing 25% to 45% by weight of solids is filtered to separate solid calcium sulfate from product phosphoric acid solution having an equivalent phosphorus pentoxide strength in the range of 25% to 35% by weight, the improved method of cooling said reaction slurry with air and precipitating calcium sulfate which comprises directing a portion of said slurry onto the inner surface of a downwardly converging passage, passing an inlet ambient air stream downwards through said passage whereby said air stream is accelerated, projecting said slurry transversely into said air stream at the lower end of said passage, whereby said slurry is rapidly and uniformly dispersed into said air stream as finely divided particles and droplets, separating the resulting air stream heated to a temperature in the range of 130° F. to 185° F. from the cooled slurry, and returning the cooled slurry as said cooled recycle slurry.

3. Process of claim 1, in which said reaction of mixed slurry with sulfuric acid is carried out in a plurality of stages, and the slurry portion which is cooled by said transverse contact with air is withdrawn from a reaction stage which precedes the last stage.

4. Process of claim 1, in which said heated air stream is directed into a cyclonic path and simultaneously contacted with a plurality of radial streams of water, whereby entrained fluosilicic acid is separated from said air stream.

5. Process of claim 1, in which a portion of said product phosphoric acid solution is combined with said sulfuric acid, and the combined acid stream is reacted with said mixed slurry.

References Cited by the Examiner

UNITED STATES PATENTS

| | | | |
|---|---|---|---|
| 630,506 | 8/99 | Hirzel | 261—118 |
| 1,402,043 | 1/22 | Boltshauser | 261—118 |
| 1,511,749 | 10/24 | Powell | 261—118 |
| 2,064,833 | 12/36 | Howard | 23—165 |
| 2,699,985 | 1/55 | Delruelle | 23—165 |
| 3,057,700 | 10/62 | Gross | 23—165 |

MAURICE A. BRINDISI, *Primary Examiner.*